Patented Aug. 6, 1940

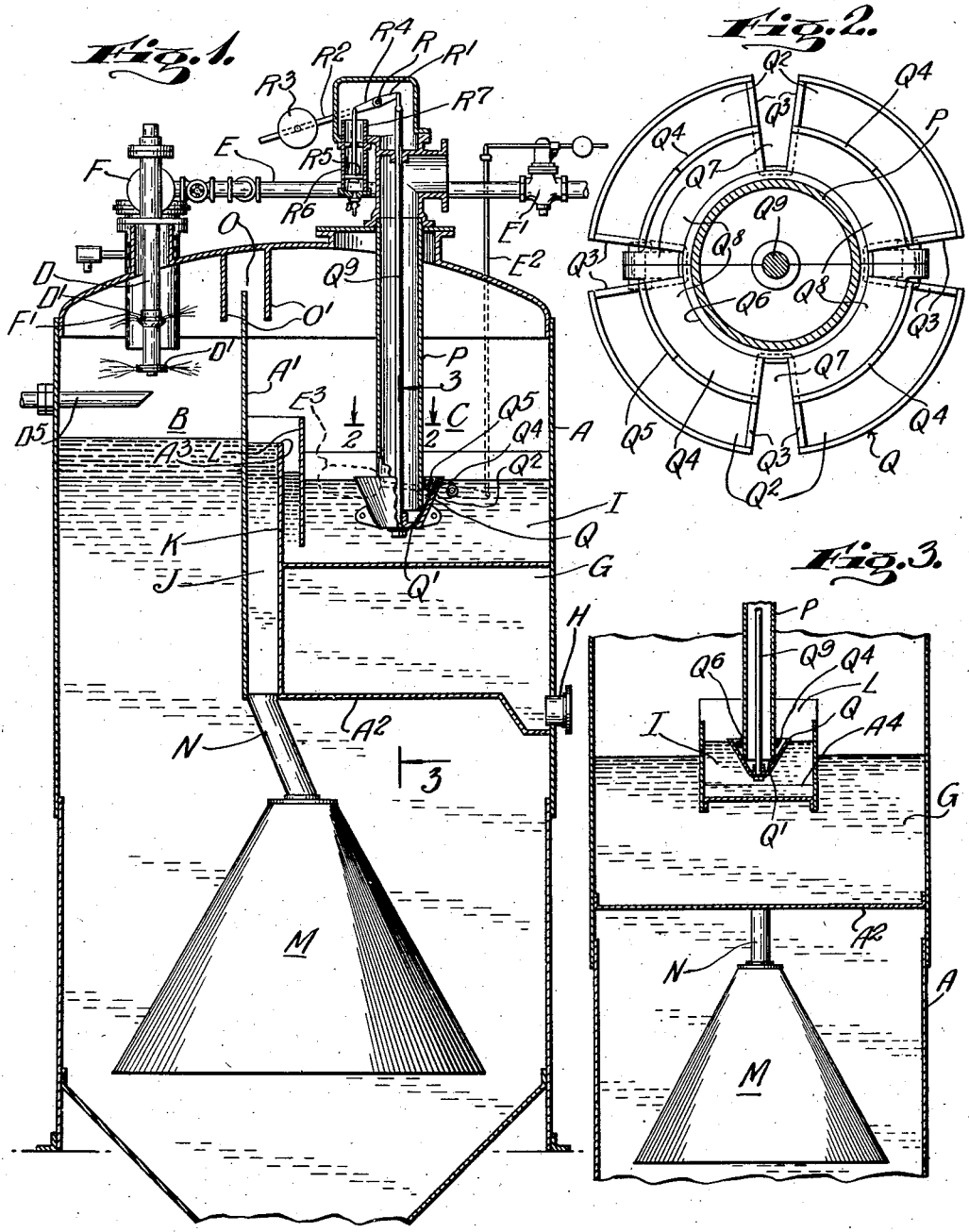

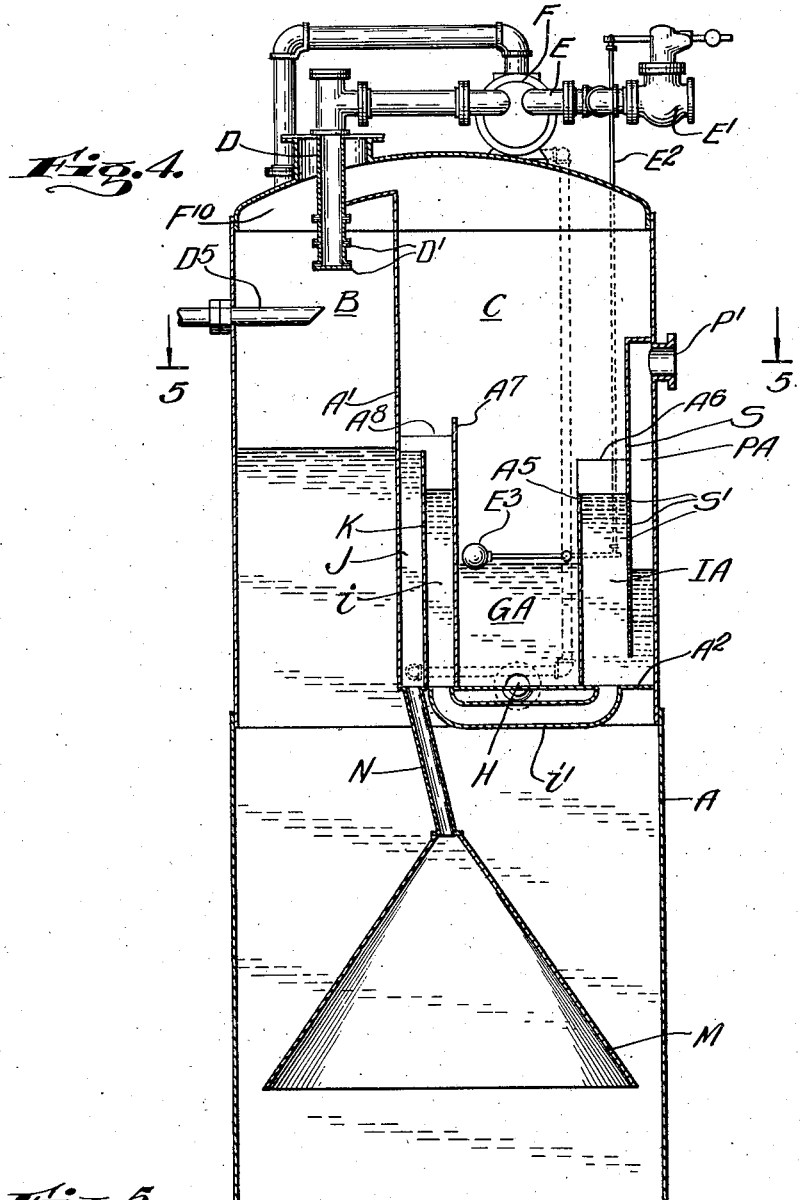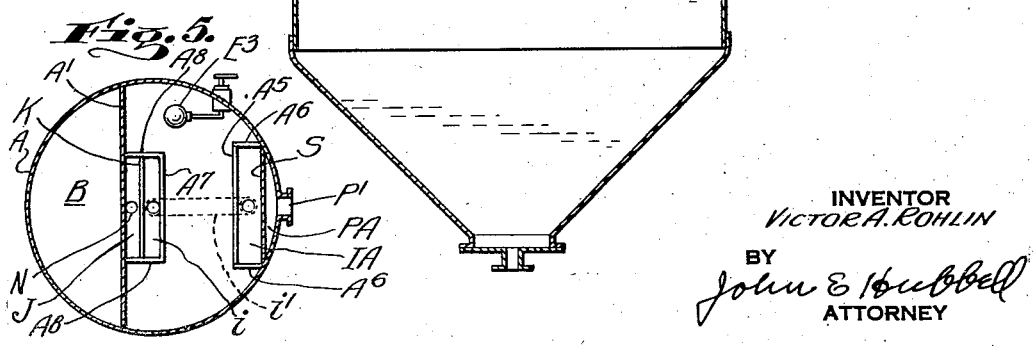

2,210,151

UNITED STATES PATENT OFFICE 2,210,151

WATER PURIFYING AND DEGASIFYING APPARATUS

Victor A. Rohlin, Philadelphia, Pa., assignor to Cochrane Corporation, Philadelphia, Pa., a corporation of Pennsylvania Application August 11, 1938, Serial No. 224,247

3 Claims. (Cl. 210—15)

The general object of the present invention is to provide improved apparatus for heating, purifying and degasifying water for boiler feed and other purposes.

More specifically, the object of the present invention is to eliminate or minimize an objectionable tendency to water level fluctuation, or "hunting," inherent in the operation of known forms of prior apparatus which is of the so-called hot process water treating type, and comprises a settling or sedimentation space open at its upper end to, and receiving water from, a primary heating and degasifying space, and supplying water to a final heating and degasifying compartment alongside said space, said compartment comprising an upper steam space and separate intermediate and discharge water spaces, each open at its upper end to said steam space. The water treated in such apparatus passes from the sedimentation space to the discharge space through said intermediate space, and in the last mentioned space is subjected to intimate contact with, and agitation by, steam supplied to the apparatus for water heating and degasifying purposes.

In one known form of such apparatus, the water in the intermediate space is subjected to an atomizing steam jet action, by which water is sprayed from the intermediate space into the discharge space, over a partition wall between, and having its upper edge above the normal water level in each of the two spaces. In a second known form of such apparatus, the water in the intermediate space is subjected to the reboiling action of steam discharged into the water through submerged steam supply means, and the water overflows from the intermediate space into the discharge space. In each of said forms, the supply of water to the apparatus is automatically controlled in accordance with the height of water level in the discharge water space, from which water is withdrawn as needed by the boiler feed pump or analogous means for withdrawing water from the apparatus.

In each of the two above mentioned forms of apparatus, as heretofore constructed, the water passes by gravitational flow from the sedimentation space to the intermediate space, at a rate which is dependent both on the height of water level in the primary heating and degasifying space, and on the back pressure which opposes the flow of water from the sedimentation space into the intermediate space and is created by the water in the last mentioned space.

In the operation of each of said prior forms of apparatus, an increase in the demand for treated water, or apparatus load, necessarily results in an increase in the rate at which steam is supplied to the apparatus. An increase in the steam supply rate results directly in an immediate and rather abrupt increase in the rate at which water is passed from the intermediate space into the discharge space, and in a consequent reduction in the back pressure with which the water in the intermediate space opposes the inflow of water into said space from the sedimentation space. In consequence the increased rate of water movement into the discharge space of the apparatus resulting from an increase in the steam supply rate is maintained, until reduced as a result of one, or the other, or both, of two changes in operating conditions, namely, a reduction in the rate of steam supply, and a reduction in the height of water level in the primary heating and degasifying space.

The abrupt increase in the rate at which water is supplied to the discharge space, tends to an increase in the height of water level in that space, and thereby to make the rate at which water is supplied to the apparatus, lower than the rate at which water is being discharged from the apparatus, with a corresponding reduction in the height of water level in the primary heating and degasifying space. In normal operation, each period in which the rate of water inflow to the apparatus, is thus below the rate of outflow, will be followed by a period in which the rate of water inflow exceeds the rate of water discharge or outflow and, as those skilled in the art will understand, the supply of water at a rate exceeding the rate of water outflow, tends to the reestablishment of the condition in which the rate of water inflow will be lower than the rate of water outflow. Operative results which are the converse of those just described tend to occur on a reduction in the apparatus load, or demand on the apparatus for treated water.

The described "hunting," or fluctuation in water levels and in the relative rates at which water is supplied to and withdrawn from the apparatus, tends to objectionable disturbances in, and a reduction in efficiency of, the water treating operation, and, as those skilled in the art will understand, may react unfavorably on the operation of the apparatus supplied with treated water, and on the operation of apparatus supplying steam to the water treating apparatus, such steam ordinarily being exhausted, or bled, from turbines or other steam motors.

The above described hunting tendency is eliminated, or substantially minimized, in accordance with the present invention, by the simple expedient of providing the apparatus with a weir chamber receiving the gravitational discharge from the sedimentation space, and discharging water over its weir into the intermediate water space, at a rate which is independent of the back pressure in the intermediate space, and is primarily dependent only on the height of water level in the primary heating and degasifying chamber. While with the improved apparatus, an increase or decrease in the rate at which steam supplied to the apparatus may result in a brief initial abrupt increase or decrease in the rate at which water is passed from the intermediate compartment space to the discharge space, there is no corresponding change in the rate at which water enters the intermediate space, and the rate of outflow from the intermediate space quickly becomes approximately equal to the rate at which water passes to the sedimentation space.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Of the drawings:

Fig. 1 is a sectional elevation of one form of apparatus including an embodiment of the present invention;

Fig. 2 is a section on the line 2—2 of Fig. 1, and on a larger scale than that figure;

Fig. 3 is a section on the line 3—3 of Fig. 1;

Fig. 4 is a sectional elevation of a second form of apparatus including an embodiment of the present invention; and Fig. 5 is a small scale section on the line 5—5 of Fig. 4.

In the drawings, and referring first to the apparatus shown in Figs. 1, 2, and 3, A represents a tank in which water heating, chemical treating, settling and degasifying operations are performed. The upper portion of the space within the tank A is divided by a vertical partition A' into an initial water heating space or chamber B, and a final degasifying chamber or compartment C. The partition A' is connected at its lower end to a transverse partition wall $A^2$ which forms the bottom wall of the compartment C. The bottom of the space B is formed in effect by the water body in the sedimentation space of the apparatus which occupies all of the tank interior, except the portions forming the space B and chamber C.

The water to be treated, is sprayed into the space B by a device D comprising a vertical pipe extending downward into said space from the top wall of the spray and provided with suitable spray nozzles D'. The spray device D receives water from a supply pipe E, through the water space of a vent condenser F. The condensing space of the latter receives gases and vapors from the space B through a vent connection F'. The supply of water to the pipe E is controlled by a valve E' operated through a link $E^2$ by a pivoted float $E^3$, which floats on the water in a water outlet or discharge space G in the chamber C, or in an associated float chamber connected to the water space G. The treated water is discharged from the tank A through the outlet H. Chemical water purifying material may be supplied to the space B through a pipe $D^5$.

In addition to the water space G, water spaces I and J are provided to the compartment C, each of the three water spaces being open at its upper end to the steam space formed by the upper portion of the compartment C. The intermediate water space I is shown as in the form of a horizontally disposed box open at its upper side and having its bottom wall located at an appreciable distance above the partition $A^2$, and, as shown clearly in Fig. 3, of a width appreciably less than the tank diameter, so that the volume of the space I is quite small in comparison with the volume of the water space G. The water space J is a weir chamber extending upward from the partition $A^2$ between the vertical partition A' and the adjacent end wall of the intermediate space I. The wall of the weir chamber which is parallel to and spaced away from the partition A' is formed by a plate K, which forms a weir over which water flows from the chamber J into the space I. To minimize disturbance by the water flow into the space I, of the water level therein, a baffle plate L parallel to and spaced away from the plate K is extended downwardly into the space I. Water passes to the weir chamber J from the sedimentation space through the customary conical collector or drawoff element M and a pipe N connecting the smaller upper end of the element M to the lower end of the chamber J.

Steam supplied to compartment C and not condensed therein, and air liberated in that compartment, pass into the space B through a port O formed in the upper portion of the partition A', baffles O' being provided to prevent water splashing through the port in either direction. The steam used in the apparatus is supplied through a vertical pipe P extending downward into the water space I and having its lower end below the water level normally maintained in said space. Steam supplied through the pipe P serves to atomize the water received in the space I and to spray the atomized water out of that space and into the water space G.

The water atomizing and spraying means shown in Figs. 1, 2, and 3, comprises a spray head Q which is of inverted bell, or cup form, and is carried by a rod $Q^9$. The latter is shown as axially disposed within the steam supply pipe P. The latter has its lower end beveled for engagement with the conical valve seat Q' formed on the inner wall of the member Q adjacent the lower end of the latter. The steam, which in normal operation is discharged from the pipe P through the space between its lower end and the seat Q', is delivered into the lower ends of channels $Q^2$ formed in the atomizer Q. As shown, there are four channels $Q^2$, each of which in horizontal cross section is an annular arc of a little less than 90°. The outer wall of each channel $Q^2$ is formed by the conical outer shell portion of the chamber Q. The adjacent walls $Q^3$ of adjacent channels $Q^2$ are shown as radial, and the inner wall $Q^4$ of each channel is shown as formed by a section of a hollow cone coaxial with the outer wall of the member Q. Each wall $Q^4$ terminates at its upper end in a weir edge $Q^5$ and merges at its lower end into a tubular portion $Q^6$, which forms a guide sleeve receiving the pipe P.

The adjacent end walls $Q^3$ of adjacent channels are spaced apart to form radial water inlet channels $Q^7$ open at their outer edges. These channels supply water to the adjacent ends of troughs $Q^8$, there being one of these troughs between the inner wall $Q^4$ of each channel $Q^2$ and the adjacent portion of the sleeve $Q^6$. The upper weir edge $Q^5$ of each wall $Q^4$ is downwardly inclined slightly from each end towards its middle, so that at low loads the water inflow into the channel $Q^2$ is concentrated at the central portion of that channel, whereas at heavier loads the inflow of water to each channel is distributed along the whole length of the wall $Q^4$. At overloads water may enter each channel $Q^2$ over the downwardly inclined upper edges of the corresponding end walls $Q^3$ and over the horizontal upper edge of the outer wall of the channel.

The member Q is subjected through its supporting rod $Q^9$ to a valve seating force adequate to insure the desired jet velocity of steam discharge through the annular space between the lower end of the pipe P and the seat $Q'$, the member Q thus serving in effect as a loaded back pressure valve controlling the downflow of steam through the pipe P. The pressure drop past said valve or excess of pressure in the pipe P over that in the compartment C may obviously vary with conditions of use, and under ordinary conditions may well be in the neighborhood of a pound per square inch. The magnitude of that pressure is determined in the apparatus shown in Fig. 1, by the action of valve loading means which comprises a rock shaft R carrying a lever arm $R'$, to which the upper end of the rod $Q^9$ is link connected, and having an oppositely extending lever arm $R^2$ which carries an adjustable counterweight $R^3$. Another lever arm $R^4$ carried by the rock shaft R, is link connected to the upper end of the stem of a dashpot piston $R^5$ working in a dashpot chamber $R^6$ and operating to minimize any tendency to chattering movement or slamming of the device Q. A cup-like extension $R^7$ at the upper end of the chamber $R^6$ collects water of condensation and thereby keeps said chamber filled with liquid.

Except for its weir chamber J, the apparatus shown in Figs. 1, 2, and 3, does not differ essentially from prior apparatus in commercial use, and which is shown, for example, by Patent No. 2,042,792, granted July 20, 1935. In such prior commercial apparatus, water passes from a conical collector through a pipe corresponding to the previously mentioned pipe N, directly to an intermediate water space corresponding to the previously mentioned space I, and into which steam supply atomizing provisions extend as in the construction hereinbefore described.

While an increase in the load lowers the water level in the space I relative to the level of the spray head Q, in suitably designed apparatus the relative change in the two levels may well be so small as to be without practical significance. It has been found practically desirable, however, to provide for an appreciable vertical movement of the spray head, as the steam supply rate is varied. In commercial practice, the vertical movement of the spray head between its no load and full load positions is about three inches. The down movement of the spray head Q, as the load increases, results in a corresponding lowering of the water level in the space I. A three inch reduction in the height of water level in an intermediate water space receiving water directly from a sedimentation space, as it does in apparatus shown in the above mentioned prior patent, reduces the back pressure opposing the flow of water into the intermediate space sufficiently to give rise at times to a seriously objectionable hunting action of the character previously described. As will now be apparent, the only water level change in the apparatus shown in Figs. 1, 2, and 3, which can significantly effect the rate of water flow through the weir chamber J into the space I, is a change in the water level in the space B. With properly proportioned apparatus of the kind shown, the water level in the space B need vary but little, since the loss of pressure head required for the maximum rate of water flow into the weir box J occurring in normal operation, will be quite small.

Fig. 4 illustrates an embodiment of the present invention in apparatus of the form previously mentioned, in which steam is injected into the water in the intermediate water space to obtain a reboiling action. For the most part, the apparatus shown in Fig. 4 may be, and as shown, is identical in substance and form with the apparatus shown in Figs. 1, 2, and 3, and corresponding parts shown in the two figures, are designated by similar reference symbols. The one really significant difference between the two forms of apparatus, is in respect to the character of their provisions for effecting contact of steam with the water in their respective intermediate spaces. Because of that difference, the intermediate water space IA of Fig. 4 may well be, and as shown, is, of greater depth than the space of the construction first described.

The steam used in the apparatus shown in Fig. 4 is supplied through a tank inlet $P'$ which opens to a vertically disposed steam space PA closed at its upper end and water sealed at its lower end, and having its vertical walls collectively formed by an arc shaped portion of the tank wall and a plate S. The latter, as shown, has its vertical edges welded to the tank wall at the edges of the said arc shaped portion thereof. As shown, the water space IA has its bottom wall formed by a portion of the horizontal partition $A^2$. One vertical wall of the space IA is formed by a plate $A^5$ parallel to the plate S and displaced from the latter toward the axis of the tank. As shown, the vertical edges of the plate $A^5$ are connected to the tank wall by plates $A^6$ extending transversely to the plate $A^5$ and having their edges remote from the latter welded to the tank wall adjacent the connection to the latter of the edges of the plate S. The portion of the steam space PA below the top of the water space IA is thus within the latter, and is filled with water to a level which is that of the top of the space IA, when no steam is being supplied to the apparatus, and which is lower when steam is being supplied.

A multiplicity of small distributed orifices $S'$ extend through the plate S in the portion thereof extending from a level shown as slightly below the top of the space IA, down to, or nearly to the bottom of the plate.

The water passing into the delivery space GA from the space IA flows over the upper edge of the plate $A^5$. With the convenient, though not essential disposition of the space IA relative to the tank wall and steam inlet $P'$ illustrated in Fig. 4, the space IA is necessarily horizontally displaced from the weir chamber J, so that water cannot directly overflow from the latter into the space IA. In the particular form of construction illustrated, the water flowing over the weir formed by the side wall plate K of the chamber J, is received in a water space $i$. That space is open at its upper end, and has its opposing side wall formed by a partition plate $A^7$, and has its vertical end walls formed by partition plates $A^8$. Water passes from the space $i$ to the space IA through a U pipe $i$, having its ends in communication with said spaces through ports formed in their bottom walls.

In normal operation, water will flow over the plate $A^5$ from the space IA into the space GA, at the same weight rate at which water passes from the weir chamber $i$ to the space IA. In general, however, the volume rate of flow out of the space IA will exceed the volume rate of inflow into the space as a result of the steam lift action of the steam injected into the water through the orifices S' and bubbling up through the water in the space IA.

An increase in the rate of steam supply, results in an increase in the pressure head required to move the steam through the orifices, and consequently in an increase in the steam pressure in the space PA, relative to the steam pressure in the steam space of the compartment C. That relative pressure increase lowers the water level in the space PA, and thereby increases the number of ports S' receiving steam from the space PA. Moreover, the average orifice rate of steam flow is increased as the rate of steam supply is increased, because the resultant increase in the average of the pressure drops in the different orifices or ports minimizes the flow restricting effect of the back pressure of the liquid in the space IA on the flow through the orifices S'. Moreover, the average of the back pressure opposing flow through the different orifices, and due to the steam and liquid mixture in the space IA closing flow through ports S', diminishes as the rate of steam supply is increased, because of the relative increase in the amount in the mixture, of steam and the consequent reduction in the weight and average density of the liquid and steam mixture held in the space IA.

While with the apparatus shown in Fig. 4, there need only be a very small variation in the level of the water in the space IA, the effect of an increase in the rate at which steam is supplied to the apparatus, decreases the back pressure with which the water in the chamber IA opposes the influx of water into the space IA through the pipe $i'$, exactly as it would be decreased if the water in the chamber IA were not subjected to the reboiling action provided for, but were subjected to an atomizing action by means including the vertically adjustable spray head Q shown in Figs. 1, 2, and 3.

In the form of construction shown in Fig. 4, as in that shown in Figs. 1, 2, and 3, the interposition of the weir chamber J in the path of water flow from the sedimentation space to the intermediate water space, prevents variations in the back pressure opposing the inflow of water into the intermediate space from having a significant and sustained effect on the rate at which water passes from the intermediate space into the discharge space, or such as would occur if the pipe N connected the collector M directly to the bottom of the intermediate space IA. Each form of construction is thus free from the hunting tendency of prior apparatus in which, as hereinbefore explained, a reduction in the weight of liquid in the receiving space tended to increase the rate of water flow into said space.

Having now described my invention, what I claim as new and desire to secure by Letters Patent is:

1. Water heating and degasifying apparatus, comprising in combination a treating compartment including a lower sedimentation space and an upper vapor space with a gas and vapor outlet therefrom, a second treating compartment alongside the upper portion of the first mentioned compartment and including an upper vapor space and a lower water discharge space with an outlet therefrom for treated water, a port for the passage of vapors and gases from one vapor space to the other, an intermediate chamber located in said second compartment and open at its upper end to the vapor space therein and normally containing a body of water, means for passing water to be treated into the first mentioned vapor space at a rate dependent upon the height of water level in said discharge space and increasing and diminishing as said level falls below and rises toward a predetermined level, steam supply means adapted to discharge steam into said intermediate water chamber at a level below that of the top of said body and thereby tending to move water from said body into said discharge space and thus decrease or increase the weight of water held in said intermediate chamber as the rate of steam supply is increased or decreased respectively, and means for passing water from said sedimentation space into said intermediate chamber at a rate independent of the weight of water in said intermediate chamber and thereby normally maintaining said body of water in said intermediate chamber, the last mentioned means comprising a weir chamber from which water overflows to said intermediate chamber and which is in communication with said sedimentation space for the gravitational flow of water therefrom into said weir chamber.

2. Water heating and degasifying apparatus as specified in claim 1, in which the steam supply means comprises a spray head within said intermediate chamber and adapted to be raised and lowered as the rate of steam supplied to the apparatus is respectively decreased and increased and adapted to move water in the form of an atomized spray out of said intermediate chamber through its open upper end.

3. Apparatus as specified in claim 1, in which the water overflows from said intermediate chamber into said discharge space, and in which the steam supply means comprise means for injecting steam into the water held in said intermediate chamber thereby emulsifying the latter to an extent increasing and decreasing as the rate at which steam is supplied to the apparatus is respectively increased and decreased.

VICTOR A. ROHLIN.